US010581244B2

(12) United States Patent
Ichino

(10) Patent No.: US 10,581,244 B2
(45) Date of Patent: Mar. 3, 2020

(54) POWER ROUTER, POWER TRANSMITTING AND RECEIVING SYSTEM, AND POWER TRANSMITTING AND RECEIVING METHOD

(71) Applicant: NEC Corporation, Tokyo (JP)

(72) Inventor: Kiyohisa Ichino, Tokyo (JP)

(73) Assignee: NEC Corporation, Tokyo (JP)

( * ) Notice: Subject to any disclaimer, the term of this patent is extended or adjusted under 35 U.S.C. 154(b) by 233 days.

(21) Appl. No.: 15/326,406

(22) PCT Filed: Jul. 17, 2015

(86) PCT No.: PCT/JP2015/003614
§ 371 (c)(1),
(2) Date: Jan. 13, 2017

(87) PCT Pub. No.: WO2016/013191
PCT Pub. Date: Jan. 28, 2016

(65) Prior Publication Data
US 2017/0207627 A1    Jul. 20, 2017

(30) Foreign Application Priority Data
Jul. 23, 2014   (JP) ................................ 2014-150043

(51) Int. Cl.
*H02J 3/14* (2006.01)
*H02J 13/00* (2006.01)
*H02J 3/00* (2006.01)

(52) U.S. Cl.
CPC ................ *H02J 3/14* (2013.01); *H02J 3/005* (2013.01); *H02J 13/0079* (2013.01); *Y02B 70/3225* (2013.01); *Y04S 20/222* (2013.01)

(58) Field of Classification Search
CPC .......... H02J 3/14; H02J 13/0079; H02J 3/005; Y02B 70/3225; Y04S 20/222
See application file for complete search history.

(56) References Cited

U.S. PATENT DOCUMENTS 4,204,127 A * 5/1980 Carter, II .................. H02J 3/14
307/35
5,297,015 A * 3/1994 Miyazaki .................. H02J 3/00
307/151
(Continued)

FOREIGN PATENT DOCUMENTS

CA    2888417 A1    4/2014
EP    2911258 A1    8/2015
(Continued)

OTHER PUBLICATIONS

International Search Report corresponding to PCT/JP2015/003614, 2 pages, dated Oct. 6, 2015.
(Continued)

*Primary Examiner* — Ziaul Karim
(74) *Attorney, Agent, or Firm* — Wilmer Cutler Pickering Hale and Dorr LLP

(57) ABSTRACT

[Problem] To provide a power router, a power transmitting and receiving system, a power transmitting and receiving method, and a storage medium storing a power transmitting and receiving program capable of automatically selecting a power supply destination in accordance with a power supply amount. [Solution] Based on power consumption information indicating the power consumed by loads and priority information indicating the priority of the loads, a power supply destination selection means (61) selects, from among the loads, a supply destination of the power supplied from a power supply source, said power consumption information and said priority information being stored in an information storage means (70). A power transmitting and receiving means (62) supplies the power received from the power supply source to a load selected by the power supply destination selection means (61).

7 Claims, 7 Drawing Sheets

(56) References Cited

U.S. PATENT DOCUMENTS

| | | | | |
|---|---|---|---|---|
| 2004/0081177 | A1* | 4/2004 | Henderickx | H04L 47/10 |
| | | | | 370/401 |
| 2004/0249516 | A1* | 12/2004 | Seto | H02J 3/32 |
| | | | | 700/295 |
| 2007/0114954 | A1* | 5/2007 | Hampo | B60L 15/007 |
| | | | | 318/105 |
| 2007/0288774 | A1* | 12/2007 | Tanaka | G06F 1/3209 |
| | | | | 713/300 |
| 2011/0178640 | A1* | 7/2011 | Schmidt | F24F 11/30 |
| | | | | 700/275 |
| 2012/0313443 | A1* | 12/2012 | Cheng | H02J 3/383 |
| | | | | 307/82 |
| 2016/0134109 | A1* | 5/2016 | Kogo | H02J 3/46 |
| | | | | 307/24 |

FOREIGN PATENT DOCUMENTS

| | | |
|---|---|---|
| JP | 4783453 B2 | 9/2011 |
| JP | 2012-231551 A | 11/2012 |
| JP | 2014-075903 A | 4/2014 |
| WO | WO-2013/168523 A1 | 11/2013 |
| WO | WO-2014/061259 A1 | 4/2014 |

OTHER PUBLICATIONS

Written Opinion of International Search Authority corresponding to PCT/JP2015/003614 with English translation, 7 pages, dated Oct. 6, 2015.

* cited by examiner

Fig. 4

| LEG | CONNECTION DESTINATION SPECIFICATION INFORMATION ||||||
|---|---|---|---|---|---|
| | CONNECTION DESTINATION CLASSIFICATION | CONNECTION DESTINATION MAXIMUM POWER | CONNECTION DESTINATION FREQUENCY | CONNECTION DESTINATION VOLTAGE | CONNECTION DESTINATION PRIORITY |
| FIRST LEG | POWER SOURCE | 6kW | 60Hz | 200Vrms | — |
| SECOND LEG | POWER SOURCE | 2kW | DIRECT CURRENT | 48V | — |
| FOURTH LEG | LOAD | 3kW | DIRECT CURRENT | 380V | IMPORTANT |
| THIRD LEG | LOAD | 4kW | 50Hz | 100Vrms | GENERAL |
| ... | ... | ... | ... | ... | ... |

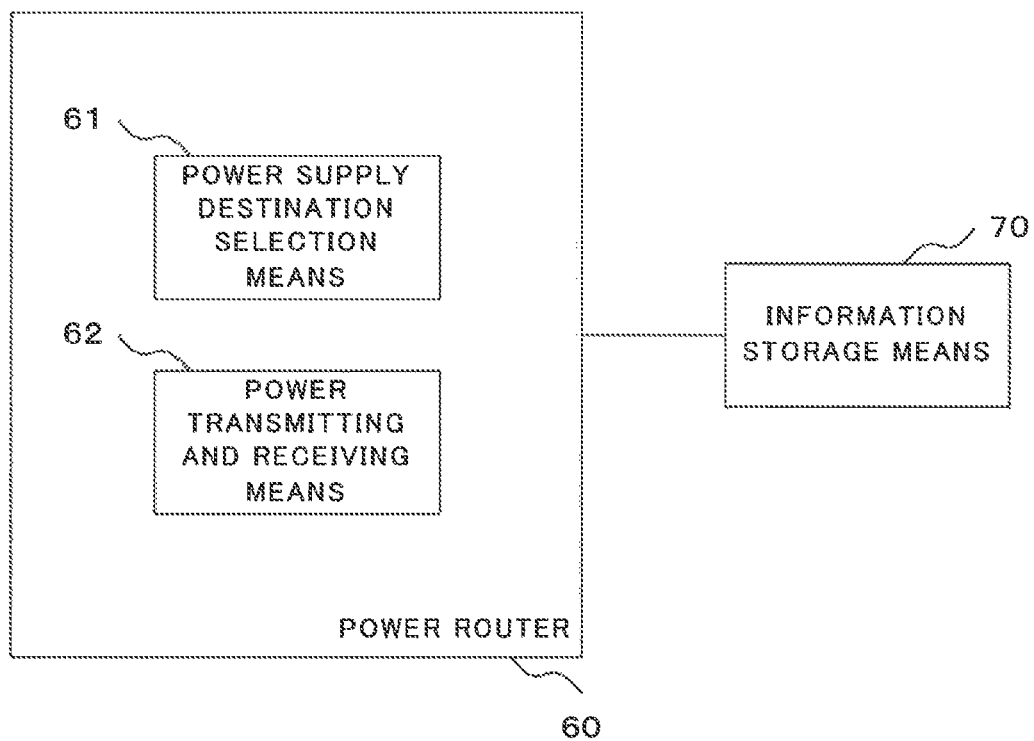

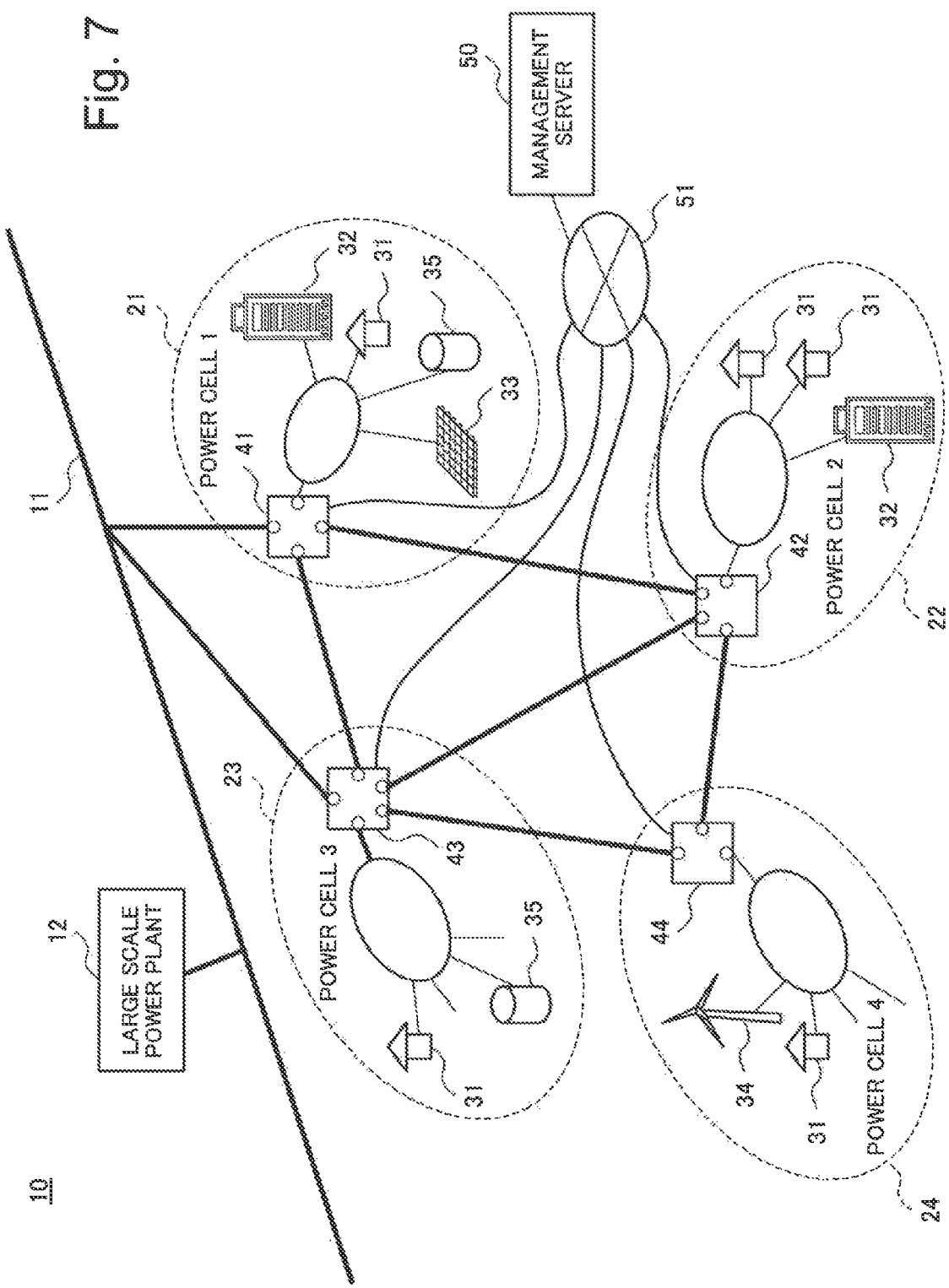

POWER ROUTER, POWER TRANSMITTING AND RECEIVING SYSTEM, AND POWER TRANSMITTING AND RECEIVING METHOD

CROSS-REFERENCE TO RELATED APPLICATIONS

This application is a national stage application of International Application No. PCT/JP2015/003614 entitled "POWER ROUTER, POWER TRANSMITTING AND RECEIVING SYSTEM, POWER TRANSMITTING AND RECEIVING METHOD, AND STORAGE MEDIUM STORING POWER TRANSMITTING AND RECEIVING PROGRAM," filed on Jul. 17, 2015, which claims the benefit of the priority of Japanese Patent Application No. 2014-150043 filed on Jul. 23, 2014, the disclosures of each of which are hereby incorporated by reference in their entirety.

TECHNICAL FIELD

The present invention relates to a power router, a power transmitting and receiving system, a power transmitting and receiving method, and a storage medium that stores a power transmitting and receiving program.

BACKGROUND ART

A big challenge in construction of a power supply system is to more stably expand a power transmission network. In recent years, the system is further facing a big challenge of affording introduction of a large amount of natural energy. To overcome such challenges, PTL 1 and NPL 1 suggest a power network system called Digital Grid (registered trademark) as a new power network.

Digital Grid (registered trademark) is a power network system in which a power network is subdivided to cells (also called as power cells) that are mutually connected in an asynchronous manner. Small-scale power cells may include, for example, an ordinary house, a building, and a commercial facility. Large-scale power cells may include, for example, a collection of such facilities and the like in a prefecture or municipality unit.

Each power cell includes equipment that functions as a power load (or, simply, a load). Further, each power cell may include power generation equipment, power storage equipment, and the like. The power generation equipment may be, for example, power generation equipment that utilizes natural energy, such as solar power generation, wind power generation, and geothermal power generation.

The power cells are connected in an asynchronous manner so that the equipment inside each power cell can freely generate power and the power cells can smoothly interchange power with one another. That is, even if a plurality of power cells are mutually connected, the voltage, phase, and frequency of power used in each power cell are asynchronous with other power cells.

FIG. 7 is an explanatory diagram illustrating an example of a power network system 10. In the example illustrated in FIG. 7, the trunk transmission power system 11 transmits trunk power that is supplied from a large-scale power plant 12. In addition, a plurality of power cells 21 to 24 are disposed. The power cells 21 to 24 each have loads, such as a house 31 and a building 32, power generation equipment 33, 34, power storage equipment 35, or the like. FIG. 7 exemplifies a solar power generation panel 33, a wind power generator 34, and the like as power generation equipment. The power storage equipment is, for example, a storage battery 35 or the like. It should be noted that the power generation equipment and power storage equipment may be collectively referred to as a dispersion type power source.

Further, the power cells 21 to 24 are respectively equipped with power routers 41 to 44 as connection hubs (connection ports) for connecting to other power cells and the trunk transmission power system 11. The power routers 41 to 44 are equipped with a plurality of legs. It should be noted that, in FIG. 7, the joining terminal of each leg is indicated by an open circle on the edge of each of powers router 41 to 44. In this example, each leg is assigned an address. Then, each leg has a joining terminal and a power converter. It should be noted that power conversion by a leg is conversion from alternating current to direct current or conversion from direct current to alternating current, or a change in the voltage, frequency, phase of power, and the like.

All the power routers 41 to 44 are connected to a management server 50 via a communication network 51, and the management server 50 integrally controls the operation of all the power routers 41 to 44. For example, the management server 50 uses the addresses assigned to the respective legs to instruct the power routers 41 to 44 equipped with the legs to transmit or receive power. In this way, the power routers 41 to 44 mediate interchange of power among the power cells.

As power interchange among power cells is enabled, for example, a plurality of power cells can share power generation equipment 33, 34 and power storage equipment 35. Interchanging surplus power among power cells makes it possible to largely decrease equipment costs, while maintaining a stable balance between power supply and demand.

CITATION LIST

Patent Literature

PTL 1: Japanese Patent Publication No. 4783453

Non Patent Literature

NPL 1: The Digital Grid Consortium, [online], [accessed on Jul. 1, 2014], Internet <URL: http://www.digitalgrid.org/>

SUMMARY OF INVENTION

Technical Problem

In the power network system 10 exemplified in FIG. 7, the management server 50 controls the operation of the power routers 41 to 44 via the communication network 51. As such, the power network system 10 exemplified in FIG. 7 requires an operator who manipulates the management server 50 for controlling the operation of the power routers 41 to 44. However, there may be a case where the operator is absent at the time of emergency, such as a disaster. In particular, there may be a case where the operator is affected by the disaster, disabled to execute a business.

Further, there is a possibility of disconnection of the communication network 51 at the time of emergency, disabling the management server 50 to control the operation of the power routers 41 to 44 via the communication network 51. Further, there is a possibility of stopping the operation of the management server 50 by a power failure.

As such, in the power network system 10 exemplified in FIG. 7, when the operator of the management server 50 is absent or the management server 50 or the communication network 51 stops operating, the power network system 10 cannot supply power, and there is a possibility that essential electric power equipment may not be operated.

Thus, the objective of the present invention is to provide a power router, a power transmitting and receiving system, a power transmitting and receiving method, and a storage medium storing a power transmitting and receiving program that can automatically select a power supply destination in accordance with a power supply amount.

Solution to Problem

A power router according to the present invention, comprises:

a power supply destination selection means that selects, from among a plurality of loads, a power supply destination of power that is supplied from a power supply source based on power consumption information and priority information stored in an information storage means, the power consumption information indicating power consumed by the loads and the priority information indicating priority of the loads; and a power transmitting and receiving means that supplies the power received from the power supply source to a load selected by the power supply destination selection means.

A power transmitting and receiving system according to the present invention, includes a power router of any mode and an information storage means.

A power transmitting and receiving method according to the present invention, comprises:

a power supply destination selection step for selecting, from among a plurality of loads, a power supply destination of power that is supplied from a power supply source based on power consumption information and priority information stored in information storage means, the power consumption information indicating power consumed by the loads and the priority information indicating priority of the loads; and a power transmitting and receiving step for supplying the power received from the power supply source to the load selected by the power supply destination selection step.

A recording medium storing a power transmitting and receiving program according to the present invention, causes a computer to perform:

power supply destination selection processing that selects, from among a plurality of loads, a power supply destination of power that is supplied from a power supply source based on power consumption information and priority information stored in information storage means, the power consumption information indicating power consumed by the loads and the priority information indicating priority of the loads; and power transmitting and receiving processing that supplies the power received from the power supply source to a load selected by the power supply destination selection processing.

Advantageous Effects of Invention

According to the present invention, a power supply destination can be automatically selected in accordance with a power supply amount.

BRIEF DESCRIPTION OF THE DRAWINGS

FIG. 4 is an explanatory diagram illustrating an example of a specification information table.

FIG. 6 is a block diagram illustrating a configuration example of a power router of a second example embodiment of the present invention.

FIG. 7 is an explanatory diagram illustrating an example of a power network system.

DESCRIPTION OF EMBODIMENTS

The following will describe particular example embodiments, to which the present invention is applied, in detail with reference to the drawings. The same components are appended with the same signs throughout the drawings, for which redundant explanations are omitted as necessary to clarify the description. It should be noted that, in the following description, a "connection counterpart" refers to the connection destination of a leg.

Figure 1:
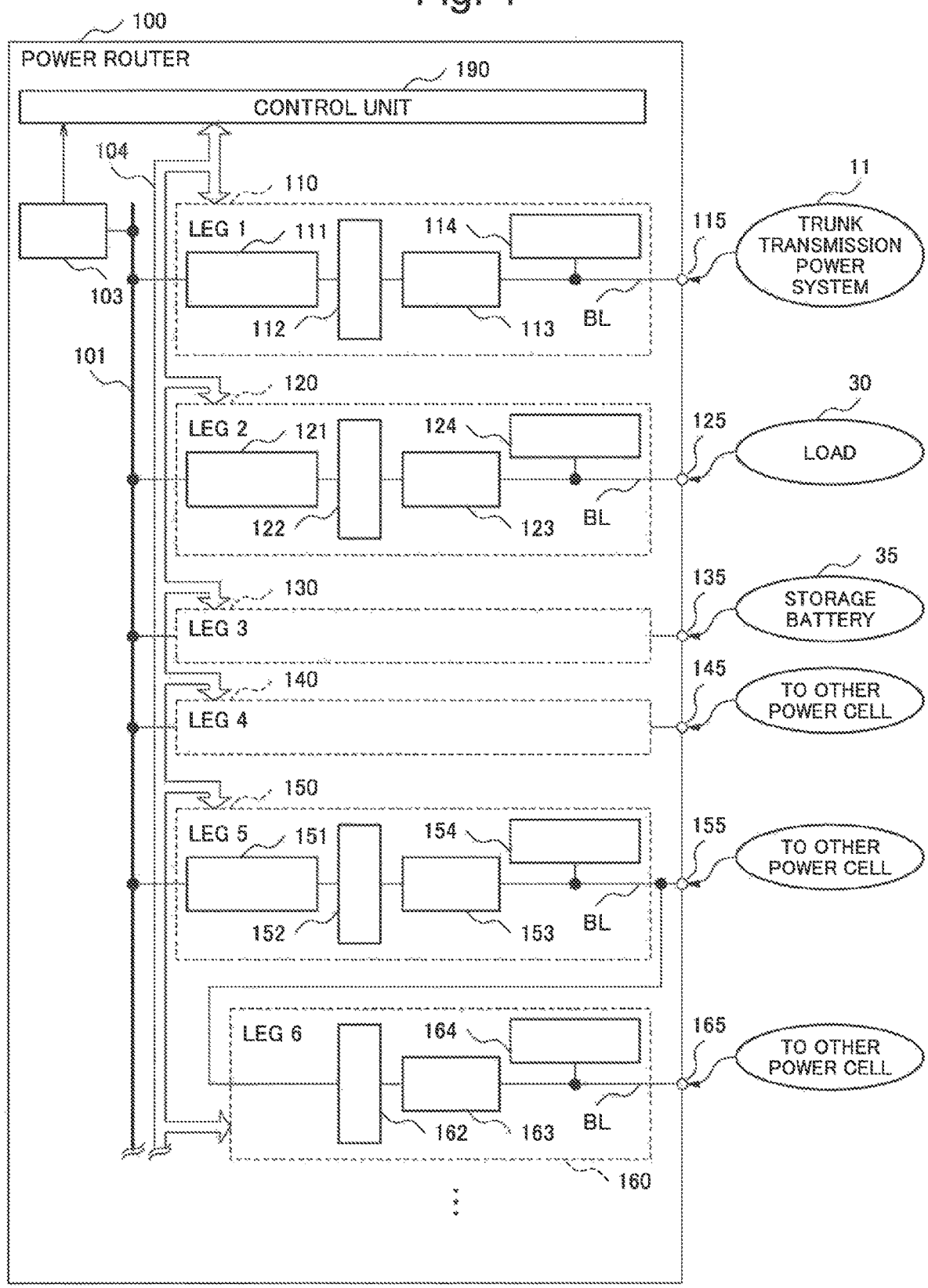
FIG. 1 is a block diagram illustrating a configuration example of a power router.
Figure 2:
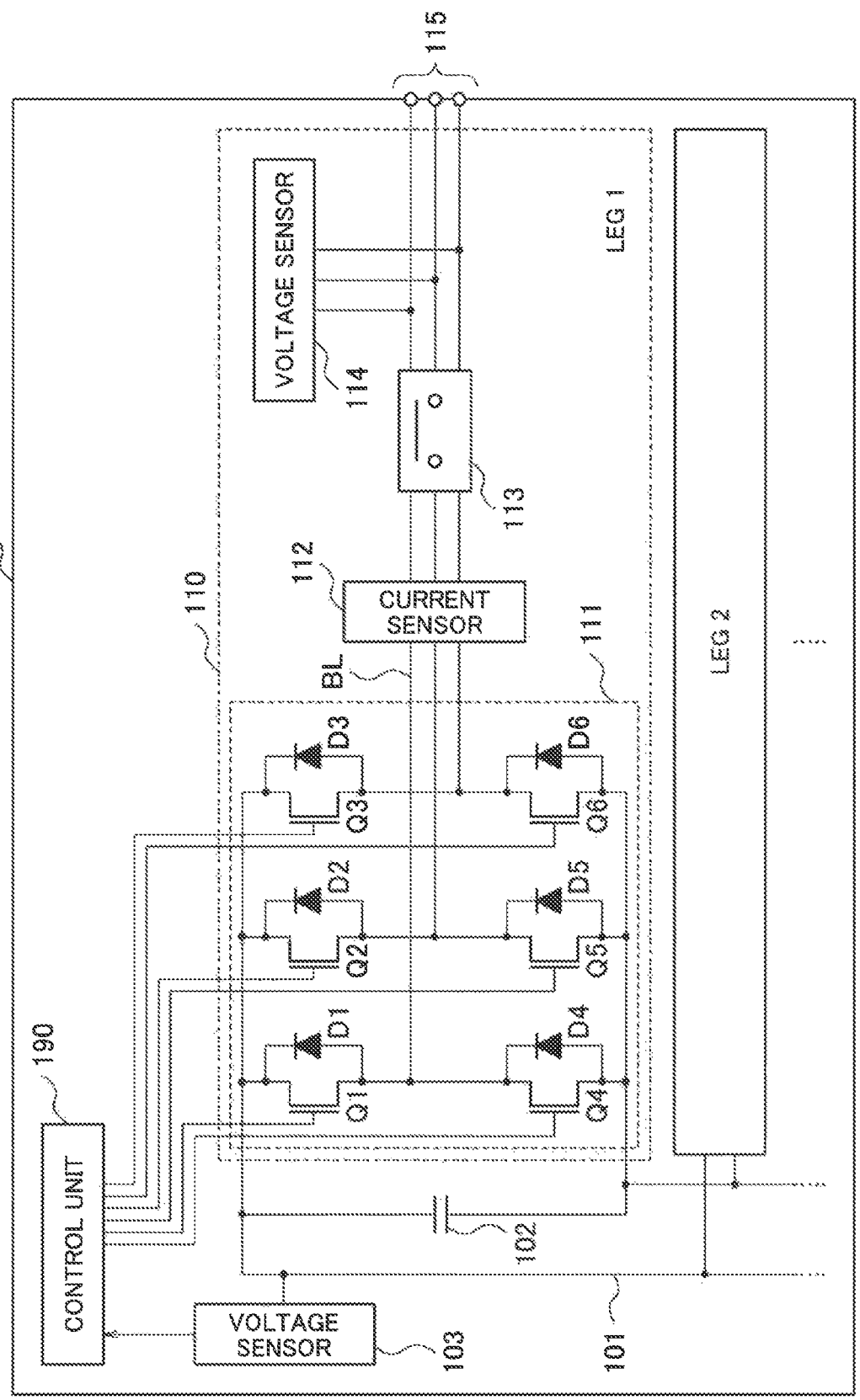
FIG. 2 is a block diagram focusing on a first leg of a power router.

First, the configuration of a power router that is common among the example embodiments of the present invention will be described. FIG. 1 is a block diagram illustrating a configuration example of a power router 100. Further, FIG. 2 is a block diagram focusing on the first leg (indicated as "leg 1" in FIG. 1) 110 of the power router 100. The power router 100 includes a direct current bus 101, a plurality of legs 110 to 160, and a control unit 190.

The direct current bus 101 of the power router 100 is connected with the legs (indicated as legs 1 to 6 in FIGS. 1) 110 to 160 in parallel. The direct current bus 101 is for the flow of direct current power. The voltage of the direct current bus 101 is controlled to maintain within a predetermined range (how voltage of the direct current bus 101 is maintained within a predetermined range will be described later).

The power router 100 is connected to an external device and the like via the legs 110 to 160, in which each of the legs 110 to 160 converts power received from the external device and the like to direct current and supplies the converted power to the direct current bus 101. As such, as each of the legs 110 to 160 converts the received power to direct current, power cells can be connected in an asynchronous manner regardless of differences in frequency, voltage, and phase.

In this example, the direct current bus 101 is a parallel type having a smoothing capacitor 102 as illustrated in FIG. 2.

The direct current bus 101 is connected with a voltage sensor 103 that measures the voltage value of the direct current bus. The voltage sensor 103 inputs information indicating the measured voltage value of the direct current bus 101 to the control unit 190. Further, as illustrated in FIG. 1, the control unit 190 maintains the voltage of the direct current bus 101 within a predetermined range by controlling the operating states of the legs 110 to 160 (operation of transmitting power to an external device or the like, operation of receiving power from an external device or the like, and the like) via the communication bus 104.

Next, the legs 110 to 160 will be described. The plurality of legs 110 to 160 are connected, in parallel to one another, to the direct current bus 101. FIG. 1 exemplifies six legs 110 to 160. The six legs 110 to 160 are defined as a first leg 110, a second leg 120, . . . , a sixth leg 160 as illustrated in FIG. 1. It should be noted that in FIG. 1, the first leg 110 is indicated as LEG 1 and the second leg 120 is indicated as LEG 2. Further, in FIG. 2, the third leg 130, fourth leg 140, and sixth leg 160 are omitted.

While the first to fifth legs 110 to 150 have the same configuration, the sixth leg 160 has a different configuration than the first to fifth legs 110 to 150 in that the sixth leg 160 does not have a power converter. First, the configuration of the first to fifth legs 110 to 150 will be described. Since the first to fifth legs 110 to 150 have the same configuration, the configuration of the first leg 110 will be described as a representative. The first leg 110 includes a power converter 111, a current sensor 112, a switch 113, a voltage sensor 114, and a joining terminal 115. The power converter 111 has a function of converting alternating current power to direct current power and a function of converting direct current power to alternating current power. As direct current power flows in the direct current bus 101, the power converter 111 converts the direct current power of the direct current bus 101 to alternating current power of defined frequency and voltage, then, transmits the power from the joining terminal 115 to an external device or the like. Further, the power converter 111 converts the alternating current power received from the joining terminal 115 to direct current power and supplies the converted power to the direct current bus 101.

The power converter 111 has the configuration of an inverter circuit. In particular, as illustrated in FIG. 2, the power converter 111 has transistors Q1 to Q6 and diodes D1 to D6. One ends of the transistors Q1 to Q3 are connected to a high-potential side power wire. The other ends of the transistors Q1 to Q3 are respectively connected to one ends of the transistors Q4 to Q6. The other ends of the transistors Q4 to Q6 are connected to a low-potential side power wire. The high-potential side terminals of the transistors Q1 to Q6 are respectively connected to the cathodes of the diodes D1 to D6. The low-potential side terminals of the transistors Q1 to Q6 are respectively connected to the anodes of the diodes D1 to D6.

For example, by appropriately controlling on/off timing of the transistors Q1 to Q6, a node between the transistors Q1 and Q4, a node between the transistors Q2 and Q5, and a node between the transistors Q3 and Q6 each output power in respective phases of three-phase alternating current.

As described above, the power converter 111 has a configuration where six reverse parallel circuits, consisting of transistors and diodes, are three-phase bridge connected. Wires drawn out from the node between the transistors Q1 and Q4, the node between the transistors Q2 and Q5, and the node between the transistors Q3 and Q6 and connecting such nodes and a joining terminal, are referred to as branch lines BL. As three-phase alternating current is used, one leg has three branch lines BL.

While three-phase inverter circuits are used in this example because three-phase alternating current is used, a single-phase inverter circuit may instead be used in some cases. Further, the transistors Q1 to Q6 may include various active power conversion elements, such as Metal-Oxide-Semiconductor Field-Effect Transistors (MOSFET), Insulated Gate Bipolar Transistors (IGBT), and the like.

The direction of power, the frequency of alternating current power, and the like are controlled by the control unit 190. That is, switching of the transistors Q1 to Q6 is controlled by the control unit 190. Operation control by the control unit 190 will be described later.

The switch 113 is disposed between the power converter 111 and the joining terminal 115. As the switch 113 switches, the branch lines BL is switched, which causes connection or disconnection between an external device or the like and the direct current bus 101. Further, the voltage sensor 114 measures the voltage applied to the branch lines BL, and the current sensor 112 measures the current values of current that flows the branch lines BL. The switching operation of the switch 113 is controlled by the control unit 190, and the voltage sensor 114 and current sensor 112 input the measurement results to the control unit 190.

Although, in the above description, the power converter 111 is an inverter circuit and alternating current is supplied to a connection destination of each leg, each leg may be connected to a destination that receives direct current power, such as a storage battery 35 (for example, the third leg 130 illustrated in FIG. 1 is connected to the storage battery 35). In such a case, power conversion performed by the third leg 130 is DC (Direct Current)-DC conversion. Thus, the power converter 111 may be equipped with an inverter circuit and a converter circuit in parallel and selectively use either inverter circuit or converter circuit depending on whether to supply alternating current power or direct current power to a connection destination. Alternatively, a DC-DC conversion-specific leg, of which power converter 111 is a DC-DC converter, may be provided. The power router having both AC (Alternating Current)-DC conversion-specific legs and DC-DC conversion specific legs is often more advantageous in the aspect of a size and cost than each leg having an inverter circuit and a converter circuit in parallel.

Next, the sixth leg 160 will be described. The sixth leg 160 does not include a power converter. Thus, the sixth leg 160 is not directly connected to the direct current bus 101. The sixth leg 160 is connected to the direct current bus 101 via the branch line BL of the fifth leg 150. The internal wiring of the sixth leg 160 is herein also referred to as a branch line BL. The branch line BL of the sixth leg 160 is connected in between the joining terminal 155 and the switch 153 of the fifth leg 150.

The sixth leg 160 includes a switch 163, a voltage sensor 164, a current sensor 162, and a joining terminal 165. The branch line BL of the sixth leg 160 is connected to the branch line BL of the fifth leg 150 via the switch 163. That is, the joining terminal 165 of the sixth leg 160 is connected to the joining terminal 155 of the fifth leg 150. The switch 163 is disposed, yet, no power converter is disposed between the joining terminal 165 of the sixth leg 160 and the joining terminal 155 of the fifth leg 150. Thus, power is conducted, without being converted, between the joining terminal 165 of the sixth leg 160 and the joining terminal 155 of the fifth leg 150.

As such, a leg that does not have a power converter, like the sixth leg 160, may be referred to as an AC through leg.

The current sensor 162 and the voltage sensor 164 measure the current value and voltage value of the branch line BL and input the measurement results to the control unit 190. The switching operation of the switch 163 is controlled by the control unit 190.

(Operation Modes of Legs)

As described above, the first to fifth legs 110 to 150 respectively include the power converters 111 to 151, and the control unit 190 respectively controls the switching operation of the transistors Q1 to Q6 inside the power converters 111 to 151.

Here, the power router 100 plays an important role of mutually connecting the trunk transmission power system 11, the load 30, the dispersion type power source, the power cells, and the like at a node of the power network system 10. As such, the joining terminals 115 to 165 of the legs 110 to 160 are respectively connected to the trunk transmission power system 11, the load 30, the dispersion type power source, and the power routers of other power cells. The inventors of the present invention have found that the roles of the legs 110 to 160 differ depending on the connection destinations and the power router cannot serve the roles unless the legs 110 to 160 appropriately operate in accordance with the roles. Thus, the inventors of the present invention have arrived at changing the operation versions of the legs in accordance with the connection destinations.

The operation versions of legs are referred to as operation modes. In the present example embodiments, three kinds of operation modes of legs are prepared, which can be switched in accordance with the connection destinations. It should be noted that the operation modes of legs include a master mode, a stand-alone mode, and a designated power transmitting and receiving mode. The following will sequentially describe the modes.

(Master Mode)

The master mode is an operation mode when the joining terminal of a leg is connected to a stable power supply source, such as a trunk transmission power system 11, and is an operation mode for maintaining the voltage of the direct current bus 101 within a predetermined range. In the example illustrated in FIG. 1, the joining terminal 115 of the first leg 110 is connected to the trunk transmission power system 11. Then, the operation of the first leg 110 is controlled in master mode, playing the role of maintaining the voltage of the direct current bus 101. The direct current bus 101 may have power flowing in to the direct current bus 101 from the other legs 120 to 150 or power flowing out from the legs 120 to 150. With the operation of the leg 110 being controlled in master mode, when power flows out from the direct current bus 101 and the voltage of the direct current bus 101 falls below from a predetermined range, the leg 110 receives and compensates, from a connection destination (in this example, the trunk transmission power system 11), the shortage of power due to the flowed out power. On the other hand, when power flows in to the direct current bus 101 and the voltage of the direct current bus 101 exceeds a predetermined range, the leg 110 supplies, to a connection destination (in this example, the trunk transmission power system 11), the excess power due to the flowed in power. In this way, when the operation of the leg 110 is controlled in master mode, the leg 110 maintains the voltage of the direct current bus 101.

As such, at least one leg in a power router is required to operate in master mode. Otherwise, it is difficult to maintain the voltage of the direct current bus 101 within a predetermined range. In addition, although two or more legs in a power router may be operated in master mode, it is preferable that a single leg in a power router is operated in master mode. Further, the leg in master mode may be connected, for example, to a dispersion type power source (including a storage battery) mounting a self-commutated inverter, in addition to the trunk transmission power system 11. Provided that the leg in master mode cannot be connected to a dispersion type power source mounting an external commutated inverter.

Hereinafter, the leg operated in master mode may be referred to as a master leg.

The operation control of a master leg will be described. The master leg is activated as follows. First, the switch 113 is turned to an open (disconnection) state so as to connect the joining terminal 115 and a connection destination to one another. It should be noted that the connection destination is the trunk transmission power system 11. The voltage sensor 114 measures the voltage of the trunk transmission power system 11 as the connection destination and calculates the amplitude, frequency, and phase of the voltage of the trunk transmission power system 11 using Phase-Locked-Loop (PLL) and the like.

The control unit 190 adjusts output of the power converter 111 so that the voltage of the trunk transmission power system 11 with the amplitude, frequency, and phase calculated by the voltage sensor 114 is output from the power converter 111. That is, the control unit 190 determines a switching pattern between on state and off state of the transistors Q1 to Q6. When the output of the power converter 111 is stabilized, the control unit 190 transits the switch 113 to a closed state (conductive) state and connects the power converter 111 and the trunk transmission power system 11 to one another. At this point, the voltage of power output from the power converter 111 synchronizes with the voltage of the trunk transmission power system 11, thus, current does not flow therebetween.

The operation control of a master leg 110 (first leg 110) will be described. The voltage sensor 103 measures the voltage of the direct current bus 101. When the measurement result of the voltage of the direct current bus 101 exceeds a predetermined rated voltage (or voltage in a predetermined range including the predetermined rated voltage), the control unit 190 controls the power converter 111 so that the master leg 110 transmits power to the trunk transmission power system 11. In particular, for example, the control unit 190 causes the power converter 111 to adjust at least one of the amplitude and phase of the voltage of power output from the power converter 111 so that the power is transmitted from the direct current bus 101 to the trunk transmission power system 11 via the master leg 110. It should be noted that the rated voltage of the direct current bus 101 is set in advance.

Whereas, when the voltage of the direct current bus 101 falls below a predetermined rated voltage (or voltage in a predetermined range including the predetermined rated voltage), the control unit 190 controls the power converter 111 so that the master leg 110 receives power from the trunk transmission power system 11. In particular, for example, the control unit 190 causes the power converter 111 to adjust at least one of the amplitude and phase of the voltage of power output from the power converter 111 so that the power is transmitted from the trunk transmission power system 11 to the direct current bus 101 via the master leg 110. It is to be understood that performing such operation of a master leg makes it possible to maintain the voltage of the direct current bus 101 to a predetermined rated voltage.

(Stand-Alone Mode)

The stand-alone mode is an operation mode where a leg makes power of voltage of the amplitude and frequency specified by the management server 50 and transmits and receives the power to and from a connection destination. The stand-alone mode is an operation mode that is used when a leg supplies power to equipment that consumes power, such as a load 30, and when a leg directly receives power that is transmitted from a connection destination.

In the example illustrated in FIG. 1, the joining terminal 125 of the second leg 120 is connected to the load 30. Then, the operation of the second leg 120 is controlled in stand-alone mode to supply power to the load 30. In addition, as in the case of the fourth leg 140 and the fifth leg 150 connected with other power routers, the operation of the fourth leg 140 and fifth leg 150 may be controlled in stand-alone mode for transmitting required power to the other power routers. Likewise, as in the case of the fourth leg 140 and the fifth leg 150 connected with other power routers, the fourth leg 140 and fifth leg 150 may be operated in the stand-alone mode for receiving power that is transmitted from the other power routers. Further, while not illustrated, when the second leg 120 is connected with power generation equipment, instead of the load 30, the second leg 120 may be operated in stand-alone mode. Provided that, in this case, the power generation equipment mounts an external commutated inverter. The operation mode for connecting the power routers will be described later.

The leg operated in stand-alone mode is referred to as a stand-alone leg. There may be a plurality of stand-alone legs in a power router.

The operation control of a stand-alone leg will be described. First, the switch 123 is turned to an open (disconnection) state so as to connect the joining terminal 125 and the load 30 to one another. When the management server 50 instructs the power router 100 on the amplitude and frequency of power (voltage) to be supplied to the load 30, the control unit 190 controls the power converter 121 to supply the power (voltage) of the designated amplitude and frequency to the load 30. In particular, the control unit 190 determines a switching pattern between on state and off state of the transistors Q1 to Q6. When the output of the power converter 111 is stabilized, the control unit 190 transits the switch 113 to a closed state (conductive) state and connects the power converter 121 and the load 30 to one another. Then, when the load 30 consumes power, power according to the consumed portion is supplied from the stand-alone leg 120 to the load 30.

(Designated Power Transmitting and Receiving Mode)

The designated power transmitting and receiving mode is an operation mode for transmitting and receiving the designated amount of power (also referred to as designated power). As such, there are cases where designated power is supplied to a connection destination and where designated power is received from a connection destination. In the example illustrated in FIG. 1, the fourth leg 140 and the fifth leg 150 are connected with other power cells. In such a case, in designated power transmitting and receiving mode, a predetermined amount of power (designated power) is interchanged between one (for example, a leg) and the other (for example, another power cell). Further, in the example illustrated in FIG. 1, the third leg 130 is connected to a storage battery 35. In such a case, in designated power transmitting and receiving mode, a predetermined amount of power (designated power) is supplied to the storage battery 35 to charge the storage battery 35. In other cases, the designated power transmitting and receiving leg may be connected to a dispersion type power source (including a storage battery) that mounts a self commutated inverter. Provided that the designated power transmitting and receiving leg cannot be connected with a dispersion type power source that mounts an external commutated inverter.

The leg operated in designated power transmitting and receiving mode is also referred to as a designated power transmitting and receiving leg. There may be a plurality of designated power transmitting and receiving legs in a power router.

The operation control of a designated power transmitting and receiving leg will be described. As control upon activation is principally the same as that of a master leg, the description thereof is omitted.

The operation control for operating a designated power transmitting and receiving leg will be described. It should be noted that this example will be described using signs appended to the fifth leg 150 in FIG. 1. The voltage sensor 154 measures the voltage of the trunk transmission power system as a connection destination and calculates the frequency and phase of the power of the trunk transmission power system as a connection destination using PLL and the like. Then, the voltage sensor 154 calculates a target value of current that the power converter 151 inputs and outputs, based on the active power value and reactive power value designated by the management server 50 and the frequency and phase of the power of the trunk transmission power system as the connection destination. The current sensor 152 measures the present value that is the present current value. The control unit 190 adjusts the power converter 151 to output current by adding current corresponding to a difference between the target value and the present value. In particular, for example, the control unit 190 adjusts at least one of the amplitude and phase of the voltage supplied by the power converter 151 so that desired power flows between the designated power transmitting and receiving leg and the trunk transmission power system as the connection destination.

It is to be understood from the above description that the first to fifth legs 110 to 150 that have the same configuration can play three-pattern roles in accordance with the operation control.

Example Embodiment 1

[Description of the Configuration]

Figure 3:
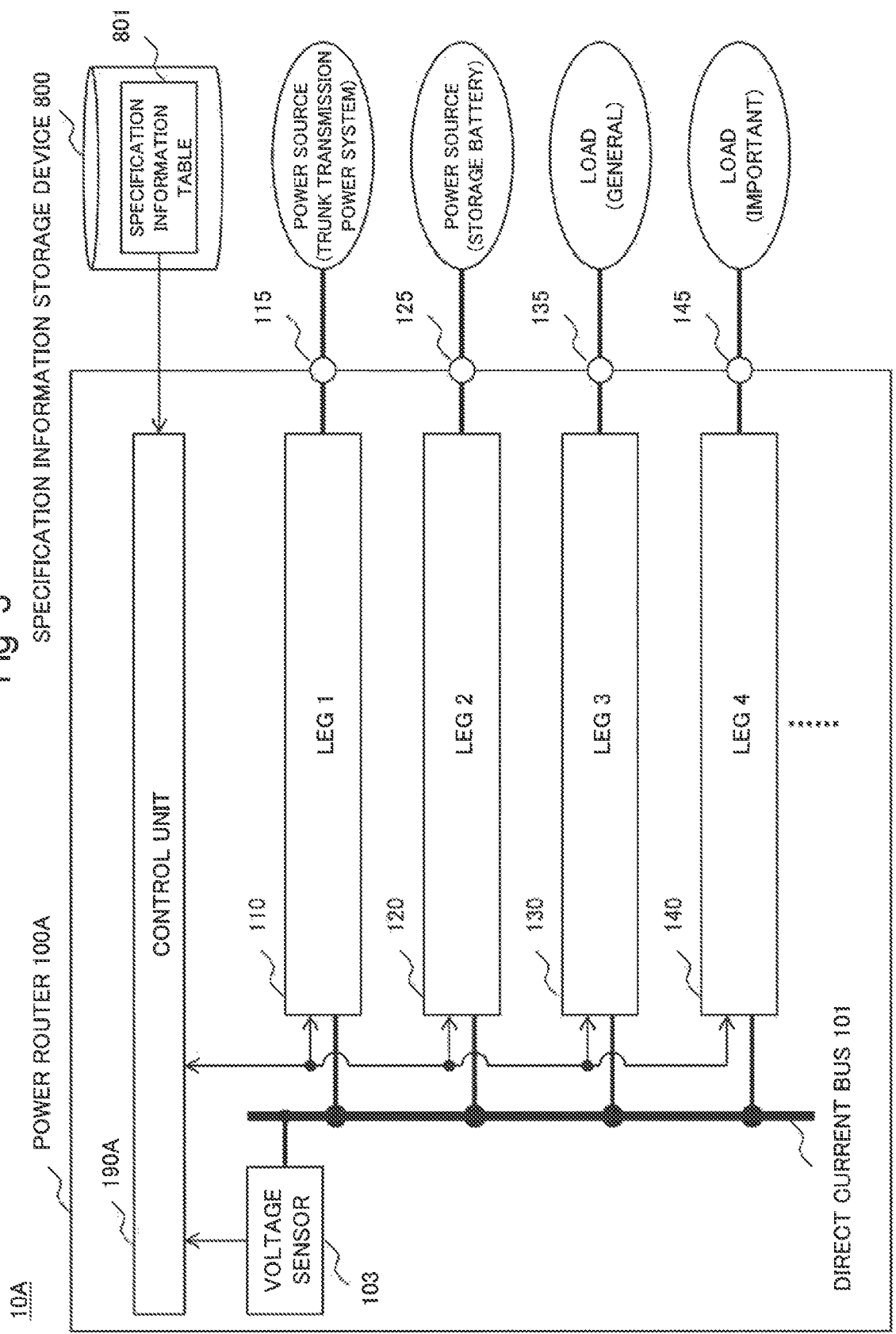
FIG. 3 is a block diagram illustrating a power network system of a first example embodiment of the present invention.

A power network system 10A of a first example embodiment of the present invention will be described with reference to the drawings. FIG. 3 is a block diagram illustrating the power network system 10A of the first example embodiment of the present invention. As illustrated in FIG. 3, the power network system 10A includes a power router 100A and a specification information storage device 800.

The power router 100A includes a control unit 190A, a voltage sensor 103, a direct current bus 101, first to fourth legs (indicated as LEG 1 to LEG 4 in FIGS. 3) 110 to 140, and joining terminals 115 to 145. The specification information storage device 800 stores a specification information table 801. It should be noted that, in the power network system 10A of the first example embodiment, the same components as the components in the power network system 10 illustrated in FIG. 1 are appended with the same signs as the components in FIG. 1 and the description thereof is omitted.

The control unit 190A controls the operation of the first to fourth legs 110 to 140 based on the information that is set in the specification information table 801 stored in the specification information storage device 800.

The specification information storage device 800 is a recording medium or a semiconductor memory that stores the specification information table 801. The specification information storage device 800 may be a recording medium or a semiconductor memory mounted on an information communication terminal, such as a personal computer, a portable telephone, or a smartphone. Further, the specification information storage device 800 may be an Integrated Circuit (IC) card that incorporates a recording medium or a semiconductor memory.

FIG. 4 is an explanatory diagram illustrating an example of the specification information table 801. In the example illustrated in FIG. 4, the specification information table records connection destination specification information set for each leg. Then, in the example illustrated in FIG. 4, the connection destination specification information includes information indicating connection destination classification, information indicating connection destination maximum power, information indicating connection destination frequency, information indicating connection destination voltage, and information indicating priority.

The information indicating connection destination classification indicates the classification of the connection destination of a corresponding leg, which is any one of "power source", "load", and "other power cell". The information indicating connection destination maximum power indicates, when the connection destination of a corresponding leg is a power source, a value of the maximum power that the power source can output and indicates, when the connection destination of a corresponding leg is a load, a value of the maximum power consumed by the load. It should be noted that the value indicated by information indicating connection destination maximum power is also simply referred to as a connection destination maximum power value.

The information indicating connection destination frequency indicates, when the connection destination of a corresponding leg is an alternating current power source, the frequency of power that the power source outputs and indicates, when the connection destination of a corresponding leg is an alternating current load, the frequency of power that is input to the load. Further, the information indicating connection destination frequency indicates "direct current" when the connection destination of a corresponding leg is a direct current power source or a direct current load.

The information indicating connection destination voltage indicates, when the connection destination of a corresponding leg is a power source, the value of voltage that the power source outputs and indicates, when the connection destination of a corresponding leg is a load, the value of voltage required for operation of the load.

The information indicating connection destination priority is set when the connection destination of a corresponding leg is a load, set as "general" when the load is a general load and set as "important" when the load is an important load.

In particular, as illustrated in FIG. 4, in the specification information table 801, the first row corresponding to the first leg 110 is set as "power source" for information indicating connection destination classification, "6 kW" for information indicating connection destination maximum power, "60 Hz" for information indicating connection destination frequency, and "200 Vrms" for information indicating connection destination voltage. Further, the second row corresponding to the second leg 120 is set as "power source" for information indicating connection destination classification, "2 kW" for information indicating connection destination maximum power, "direct current" for information indicating connection destination frequency, and "48 V" for information indicating connection destination voltage. The third row corresponding to the fourth leg 140 is set as "load" for information indicating connection destination classification, "3 kW" for information indicating connection destination maximum power, "direct current" for information indicating connection destination frequency, "380 V" for information indicating connection destination voltage, and "important" for information indicating priority. Further, the fourth row corresponding to the third leg 130 is set as "load" for information indicating connection destination classification, "4 kW" for information indicating connection destination maximum power, "50 Hz" for information indicating connection destination frequency, "100 Vrms" for information indicating connection destination voltage, and "general" for information indicating priority.

The arrangement of the rows in the specification information table 801 has a meaning, where the rows are arranged in a predetermined order. In particular, as illustrated in FIG. 4, rows where information indicating connection destination classification indicates "power source" (the first leg and the second leg) are disposed upper than rows where information indicating connection destination classification indicates "load" (the fourth leg and the third leg). Further, as illustrated in FIG. 4, among the rows where information indicating connection destination classification indicates "load" (the fourth leg and the third leg), the row where information indicating connection destination priority indicates "important" (the fourth leg) is disposed upper than the row where information indicating connection destination priority indicates "general" (the third leg). In other words, the rows where information indicating connection destination classification indicates "load" are arranged in the descending order of the connection destination priority (in the order from higher priority to lower priority).

It should be noted that, in the example illustrated in FIG. 3, the trunk transmission power system is connected to the first leg 110 as a power source and the storage battery is connected to the second leg 120 as a power source. Further, in the example illustrated in FIG. 3, a load of "general" priority is connected to the third leg 130 and a load of "important" priority is connected to the fourth leg 140.

The control unit 190A of the power router 100A reads the specification information table 801 from the specification information storage device 800 and controls the operation of the legs 110 to 140 in accordance with the content of the read specification information table 801.

[Description of Operation]

Figure 5:
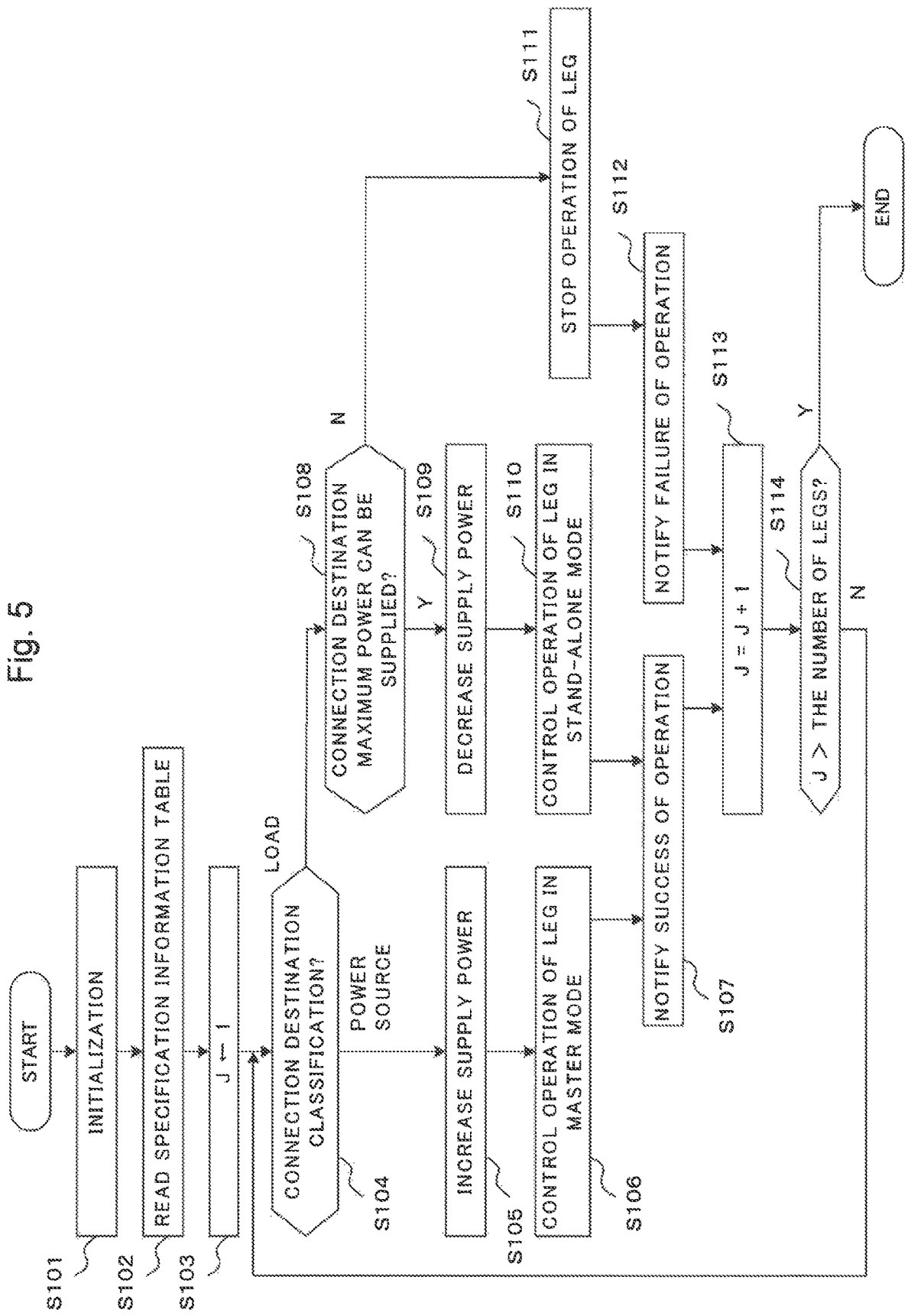
FIG. 5 is a flowchart illustrating an operation of the power network system of the first example embodiment of the present invention.

Next, the operation of the power network system 10A of the first example embodiment of the present invention will be described. FIG. 5 is a flowchart illustrating the operation of the power network system 10A of the first example embodiment of the present invention.

The timing when the control unit 190A executes the flowchart illustrated in FIG. 5 is upon activation of the power router 100A or upon update of the specification information table 801.

The control unit 190A initializes variables when the timing of executing the flowchart illustrated in FIG. 5 arrives (step S101). In particular, the control unit 190A initializes the variables of a supply power value to "0". The supply power value represents the total value of power that power source(s) connected to the leg(s) can supply.

Then, the control unit 190A reads the specification information table 801 stored in the specification information storage device 800 (step S102). The control unit 190 reads the specification information table 801, for example, by a reading means, not illustrated, that can read information in any of a contact/non-contact and wired/wireless manner or an arbitrary combination thereof.

The control unit 190A executes processing of steps S104 to S114, as will be described later, for each leg. That is, the processing is repeated for the number of times corresponding to the number of rows in the specification information table 801 that is read out in the processing at step S102. Then, the control unit 190 initializes the value of counter J to "1" (step S103). The counter J indicates the row number of the specification information table 801.

When information indicating connection destination classification in the Jth row in the specification information table 801 that is read in the processing at step S102 indicates "power source", the control unit 190A transits to step S105 and, when information indicating connection destination classification indicates "load", the control unit 190A transits to step S108 (step S104).

(When the Connection Destination of Leg is Power Source)

The control unit 190A adds the value of the maximum power of the connection destination in the Jth row in the specification information table 801 that is read in the processing at step S102 to the supply power value (step S105). Then, the control unit 190A causes, for example, a storage means (not illustrated) to store the supply power value after the addition.

Thereafter, the control unit 190A controls, in master mode, the operation of the leg corresponding to the Jth row in the specification information table 801 that is read in the processing of step S102 (step S106). The control unit 190A notifies the operator of the success of controlling the operation of the leg (step S107) and transits to step S113. As a means for notification, for example, a means that uses visual information, such as a Light Emitting Diode (LED), a means that uses audio information, such as a buzzer, a means that uses communication information, such as an e-mail, or an arbitrary combination thereof, may be used.

(When the Connection Destination of Leg is Load)

The control unit 190A determines whether or not the power router 100A can supply power corresponding to the value of the maximum power of the connection destination in the Jth row of the specification information table 801 that is read in the processing at step S102 (step S108).

In particular, whether or not the condition of the following inequality (1) is satisfied is determined.

$$\text{Supply power value} \geq \text{The value of the maximum power of the connection destination in the Jth row of the specification information table } \mathbf{801} \text{ that is read in the processing at step S102} \quad (1)$$

In the inequality (1), the supply power value is a value that is initialized in the processing at step S101, updated when the processing of step S105 or step S109 is executed, and stored in the storage means.

When determined that the inequality (1) is satisfied (Y at step S108), the control unit 190A performs the following processing. That is, the control unit 190A subtracts, from the supply power value, the value of the connection destination maximum power in the Jth row of the specification information table 801 that is read in the processing at step S102 (step S109). Then, the control unit 190A causes, for example, a storage means (not illustrated) to store the supply power value after the subtraction.

Thereafter, the control unit 190A controls, in the stand-alone mode, the operation of the leg corresponding to the Jth row of the specification information table 801 that is read in the processing at step S102 (step S110). At this time, the control unit 190A controls the operation of the leg so as to output the frequency and voltage according to the information indicating connection destination frequency and the information indicating connection destination voltage in the Jth row of the specification information table 801 that is read in the processing at step S102. Then, the processing transits to step S107.

When determined that the inequality (1) is not satisfied (N at step S108), the control unit 190A performs the following processing. That is, the control unit 190A stops the operation of the leg corresponding to the Jth row of the specification information table 801 that is read in the processing at step S102 and excludes the load connected to the leg from the power supply destination (step S111). Then, the control unit 190A notifies the operator of the failure of controlling the operation of the leg (step S112) and transits to step S113. The control unit 190A notifies the failure of the operation, for example, by the same means as the notification of the success of operation in the processing at step S107.

The control unit 190A adds one to the value of counter J (step S113) and, when the added value does not exceed the number of legs (N at step S114), transits to step S104. Whereas, when the added value exceeds the number of legs (Y at step S114), the control unit 190A ends the processing.

According to the present example embodiment, a load as a power supply destination can be automatically selected based on the connection destination maximum power corresponding to the maximum consumption power of loads connected to the legs and the connection destination priority of the loads.

Thus, even when the operator of the management server 50 is absent at the time of emergency, power can be supplied preferentially to loads with higher connection destination priority.

Further, according to the present example embodiment, whether or not power can be supplied to a general load is considered after whether or not power can be supplied to an important load with high connection destination priority is considered. Thus, when there is power that can be further supplied after being supplied to every important load, the power can be supplied to a general load. As such, power is preferentially supplied to important loads, as well as, power can be supplied to general loads according to the power supply ability, whereby power supply destinations can be flexibly selected according to the power supply ability.

It should be noted that, in the present example embodiment, a leg connected to a power supply source converts power supplied by the power supply source to direct current power as power of a predetermined mode, and a leg connected to a load converts the direct current power to power of a mode according to the load and supplies the converted power to the load. However, the predetermined mode of power, to which the power supplied from the power supply source is converted, is not necessarily direct current, yet, may be, for example, alternating current of frequency of 50 Hz, 60 Hz, and the like.

Further, although, in the present example embodiment, there are two grades, "general" and "important" in the information indicating connection destination priority, priority of three grades or more may instead be set in the information indicating connection destination priority. In particular, for example, the information indicating connection destination priority may indicate priority from the first grade with the highest priority to the sixth grade with the lowest priority. The load of the first grade is, for example, a firehouse, a police station, and the like. Further, the load of the sixth grade is, for example, a street advertisement, and the like. Then, in the processing at step S108, whether or not power can be supplied to a load is considered in the order from the load with the highest priority.

It should be noted that, when the priority of three grades or more is set in the information indicating connection destination priority, as described above, the rows, of which information indicating connection destination classification indicates "load," are arranged in the descending order of the connection destination priority in the specification information table 801.

Further, in the specification information table 801, rows, of which connection destination priority indicated by information indicating connection destination priority is the same, may be arranged in the ascending order of the values of the connection destination maximum power. By arranging the specification information table 801 in this way, for the loads with the same priority grades, whether or not power can be supplied is considered in the order from a load with smaller maximum power consumption. As the result, power can be supplied to a larger number of loads, as the supply power value decreases gently in the processing at step S109.

Example Embodiment 2

The following will describe a power router of a second example embodiment of the present invention. FIG. 6 is a block diagram illustrating a configuration example of a power router 1 of the second example embodiment of the present invention. As illustrated in FIG. 6, the power router 60 of the second example embodiment of the present invention includes a power supply destination selection means 61 and a power transmitting and receiving means 62. The power supply destination selection means 61 corresponds to the control unit 190A illustrated in FIG. 3. The power transmitting and receiving means 62 corresponds to the first to fourth legs 110 to 140 illustrated in FIG. 3.

The power supply destination selection means 61 selects, from among a plurality of loads, a power supply destination of power that is supplied from a power supply source based on power consumption information and priority information stored in an information storage means 70 where the power consumption information indicates power to be consumed by a load and the priority information indicates the priority of a load. It should be noted that the information storage means 70 corresponds to the specification information storage device 800 illustrated in FIG. 3.

The power transmitting and receiving means 62 supplies power that is received from the power supply source to the load selected by the power supply destination selection means 61.

According to the present example embodiment, a power supply destination can be automatically selected in accordance with a power supply amount.

Other Example Embodiments

Further, it is needless to say that the present invention is not limited to the above-described example embodiments and can vary in various ways without departing from the spirit of the present invention as described above. For example, while the present invention has been described as hardware configuration in the above-described example embodiments, the present invention is not limited thereto. The present invention can be realized by causing a Central Processing Unit (CPU) to execute a computer program for arbitrary processing.

In the above-described example, the program is stored in a various types of non-transitory computer readable medium, which can then be supplied to a computer. The non-transitory computer readable medium includes a various types of tangible storage medium. The examples of the non-transitory computer readable medium include a magnetic recording medium (for example, a flexible disk, a magnetic tape, and a hard disk drive), a magneto optical recording medium (for example, a magneto optical disc), a Compact Disc-Read Only Memory (CD (registered trademark)-ROM), a CD-Recordable (CD-R), a CD-ReWritable (CD-R/W), a Digital Versatile Disc (DVD (registered trademark)), Blu-ray (registered trademark) Disc (BD), and a semiconductor memory (for example, mask ROM, Programmable ROM (PROM), Erasable PROM (EPROM), flash ROM, and Random Access Memory (RAM)). Further, the program may be supplied to a computer through various types of transitory computer readable medium. Examples of the transitory computer readable medium include electric signals, optical signals, and electromagnetic waves. The transitory computer readable medium can supply the program to a computer via a wired communication channel, such as electric cables or optical fibers, or a wireless communication channel.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-150043, filed on Jul. 23, 2014, the disclosure of which is incorporated herein in its entirety by reference.

REFERENCE SIGNS LIST 10, 10A Power network system
11 Trunk transmission power system
12 Large scale power plant
21 Power cell
22 Power cell
23 Power cell
24 Power cell
30 Load
31 House
32 Building
33 Solar power generation panel
34 Wind power generator
35 Power storage equipment (storage battery)
41 Power router
42 Power router
43 Power router
44 Power router
50 Management server
51 Communication network
100, 100A Power router
101 Direct current bus
102 Smoothing capacitor
103 Voltage sensor
104 Communication bus
110 First leg
111 Power converter
112 Current sensor
113 Switch
114 Voltage sensor
115 Joining terminal
120 Second leg
121 Power converter
122 Current sensor
123 Switch
124 Voltage sensor
125 Joining terminal
130 Third leg
135 Joining terminal
140 Fourth leg
145 Joining terminal
150 Fifth leg
151 Power converter
152 Current sensor
153 Switch
154 Voltage sensor
155 Joining terminal 160 Sixth leg
162 Current sensor
163 Switch
164 Voltage sensor
165 Joining terminal
190, 190A Control unit
800 Specification information storage device
801 Specification information table
BL Branch line
D1-D6 Diode
Q1-Q6 Transistor

The invention claimed is:

1. A power router comprising:
a power transmitting and receiving unit configured to be asynchronously connected with at least one of a power cell, a power supply source, and a load;
a direct current bus configured to be connected with the power transmitting and receiving unit, and whose direct current voltage is controlled to maintain within a predetermined range; and
a power supply destination selection unit that selects, from at least the power cell and the load, a power supply destination of power that is supplied from the power supply source based on power consumption information and priority information stored in an information storage unit, the power consumption information indicating power consumed by the loads and the priority information indicating priority of the loads; wherein
the power supply destination selection unit performs supply applicability determination that determines whether or not the power transmitting and receiving unit can supply the power to each of the loads in an order from a higher priority to a lower priority indicated by the priority information and, when determined that the power can be supplied by the supply applicability determination, selects the load as the power supply destination, and wherein,
in the supply applicability determination, the power supply destination selection unit sequentially subtracts, from a total value of power that the power supply source can supply, a maximum power value as a value of maximum power consumed by each of the loads in the order from the higher priority to the lower priority indicated by the priority information and excludes, from the power supply destination, a load of which maximum power value is larger than a value of a subtracting result;
the power transmitting and receiving unit comprises a power converter configured to convert the power mutually between the direct current bus and selected power supply destination; and
supplies the power received from the power supply source to the selected power supply destination selected by the power supply destination selection unit.

2. The power router according to claim 1, wherein the power transmitting and receiving unit converts the power supplied from the power supply source to power in a mode according to the load selected by the power supply destination selection unit and supplies the power to the load.

3. The power router according to claim 1, comprising:
a plurality of the power transmitting and receiving unit that are mutually connected,
wherein each of the power transmitting and receiving unit is connected with the power supply source or the load,
the power transmitting and receiving unit connected to the power supply source converts the power received from the power supply source to power of a predetermined mode, and
the power transmitting and receiving unit connected to the load converts the power converted in the predetermined mode to power in a mode according to the load and supplies the power to the load.

4. The power router according to claim 3, wherein at least one of the plurality of the power transmitting and receiving units is connected to the direct current bus through one of the other power transmitting and receiving units.

5. A power transmitting and receiving system comprising:
the power router according to claim 1; and
the information storage unit.

6. The power router according to claim 1, wherein the power converter comprises a three-phase inverter circuit.

7. A power transmitting and receiving method comprising:
asynchronously connecting a power transmitting and receiving unit with at least one of a power cell, a power supply source, and a load;
maintaining direct current voltage of a direct current bus within a predetermined range;
selecting, from at least the power cell and the load, a power supply destination of power that is supplied from the power supply source based on power consumption information and priority information stored in information storage unit, the power consumption information indicating power consumed by the load and the priority information indicating priority of the loads, wherein
in determining the power consumption information, a power supply destination selection unit performs supply applicability determination that determines whether or not the power transmitting and receiving unit can supply the power to each of the loads in an order from a higher priority to a lower priority indicated by the priority information and, when determined that the power can be supplied by the supply applicability determination, selects the load as the power supply destination, and wherein,
in the supply applicability determination, the power supply destination selection unit sequentially subtracts, from a total value of power that the power supply source can supply, a maximum power value as a value of maximum power consumed by each of the loads in the order from the higher priority to the lower priority indicated by the priority information and excludes, from the power supply destination, a load of which maximum power value is larger than a value of a subtracting result;
converting the power mutually between the direct current bus and selected power supply destination; and
supplying the power received from the power supply source to the selected power supply destination.

* * * * *